June 26, 1928.

C. E. SCHMUNK

DIVIDED MOLD

Filed June 26, 1924

INVENTOR
Charles E. Schmunk
by W. D. Doolittle
his attorney.

June 26, 1928.                                              1,674,996
C. E. SCHMUNK
DIVIDED MOLD
Filed June 26, 1924                    2 Sheets-Sheet 2
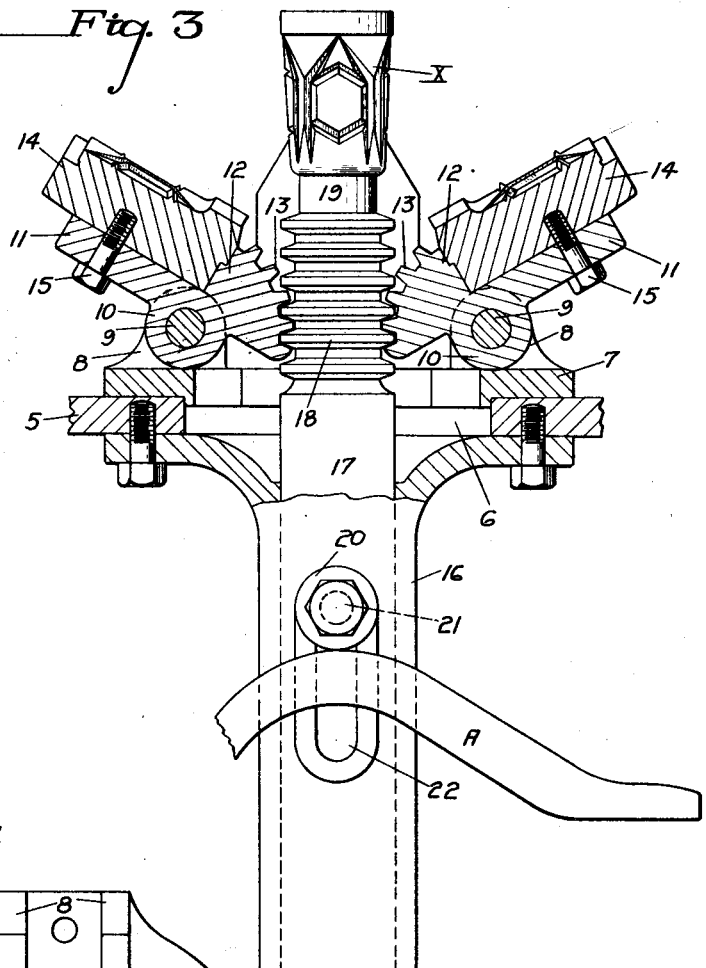
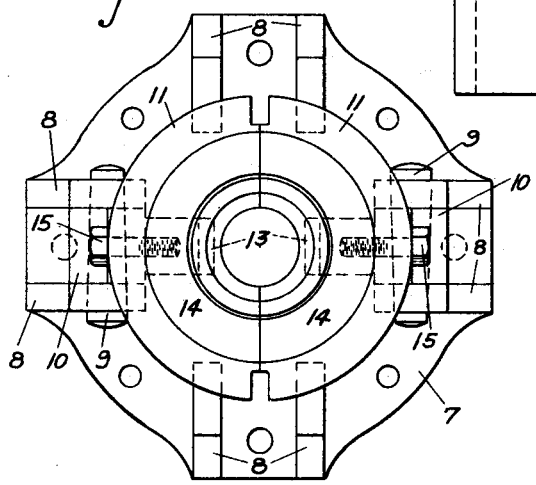
INVENTOR
Charles E. Schmunk
by W. G. Doolittle
his attorney Patented June 26, 1928.

1,674,996

UNITED STATES PATENT OFFICE.

CHARLES E. SCHMUNK, OF CRAFTON, PENNSYLVANIA.

DIVIDED MOLD.

Application filed June 26, 1924. Serial No. 722,502.

This invention is for a divided mold particularly adapted for molding glassware.

The invention has for its principal object to provide an entirely automatic divided mold, wherein the parts will be firmly held together during the pressing operation and which will automatically open without manual intervention to discharge the pressed ware.

The invention has for its further objects to provide a divided mold which may be readily used in automatic machines of the type now in use, in which plain molds are used, and to provide a mold wherein mold sections may be easily and readily replaced and changed, and which may be readily adapted to the use of different numbers of mold parts.

Other objects of the invention are to provide a mold operating mechanism of simple construction and in which all parts will be subjected to substantially uniform wear.

The invention may be readily understood by reference to the accompanying drawings, in which:

Fig. 3 is a section similar to Fig. 1, showing the mold opened out with the finished ware ready for removal; and Fig. 4 is a view similar to Fig. 2, but showing how a two-part mold may be substituted for the four-part one of Fig. 2.

Figure 1:
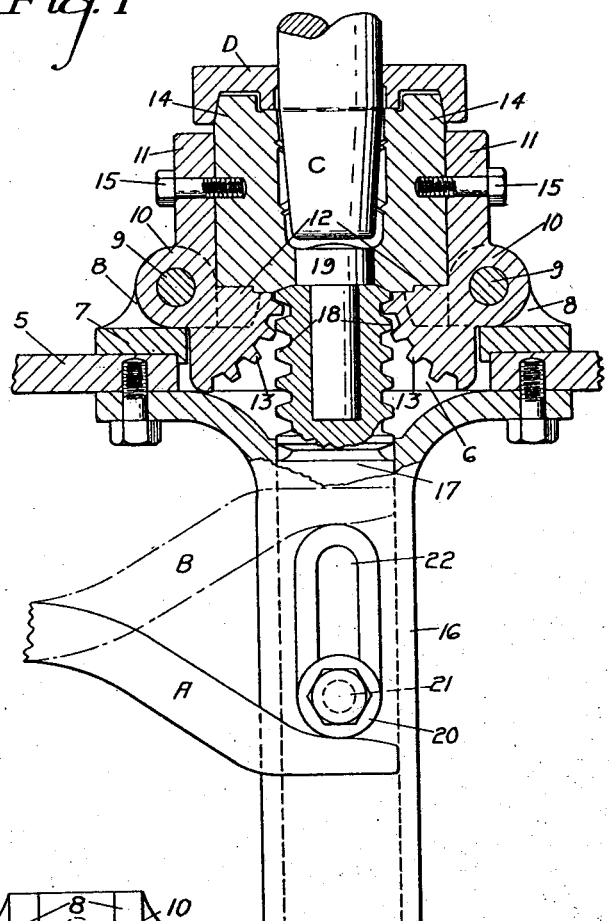
Fig. 1 represents a vertical section through the mold and operating mechanism when the mold is closed, and the pressing plunger is at the downward limit of its movement.
Figure 2:
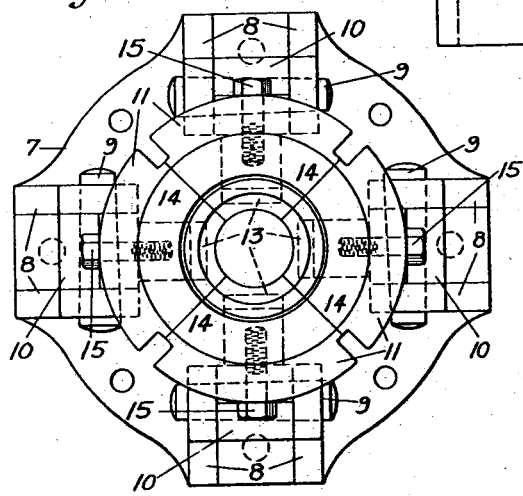
Fig. 2 is a top plan view of the mold, with the plunger and upper plate removed.

The mold may be adapted for use in any of the various types of automatic pressing machines now in wide use, and which generally comprises a rotary table on which several mold units are carried. Such machines being old and well known in the art, I have shown only the mold together with such parts of the machine as support and operate it.

In the drawings, 5 designates the usual mold carrier or supporting table of such an automatic machine. Secured over an opening 6 in the table is a bed-plate or ring 7. On the ring 7, at suitably placed intervals, are pairs of upwardly extending lugs or ears 8. I have shown four such pairs of ears.

Secured between each pair of ears, on a pivot or pin 9 passing through the ears, is a mold part carrying member 10, which is substantially a bell crank, having a vertical arm 11 and a horizontal extension 12, the horizontal extension being directed toward the center of opening 6.

On each horizontal extension is an arcuate row of teeth 13, the extension being generally similar to a segment of a gear wheel. Secured to each pivoted mold part carrying member is a mold part 14. I have shown such part as being secured by a bolt 15 passing through the upright arm of the pivoted carrier. By this arrangement, interchangeable molds may be used, and the machine readily changed to receive molds for making different shapes and sizes of articles.

Depending from the table below the opening 6 is a tubular guide 16, within which is a vertically reciprocable rod or plunger 17, generally similar to that now employed in machines of this class, but having annular or other suitably formed rack teeth 18 on its upper end, which mesh with the teeth 13 on the segment-like extensions 12 of the carriers 10. Removably set in the top of this plunger is the usual interchangeable mold bottom 19.

A cam roller 20 may be provided on the end of a pin 21 carried by plunger 17 and projecting through a slot 22 in the tubular guide 16. This cam roller is adapted to engage the usual stationary cam A, generally provided on machines of this kind for raising the plunger and holding it in elevated position. A second cam B may be provided at a suitable point in the path of travel of the mold for urging the plunger down, to insure closing of the mold. The cam and cam mechanism are no part of the present invention, and are merely referred to in order that the operation of the mold may be clearly understood.

The pressing plunger is designated C, and, in Fig. 1, is shown centered in the mold. Associated with the plunger is a cap plate D that is lowered in advance of the plunger, and which is recessed to receive the upper ends of the mold parts.

It will be noted that the construction of the gear segment on each carrying member is such as to engage the ring 7 and prevent the upright extension 11 of the member from swinging inwardly past vertical position.

In operation, the upward movement of the lower plunger 17 is effected after the pressing plunger has completed its work and has withdrawn from the mold. As the bottom plunger moves up, the mold sections, by reason of rack teeth on the plunger being engaged in the gear segments, are opened out to the position shown in Fig. 3, while the completed ware $x$ is elevated with the bottom of the mold.

The mold will be closed in like manner by the downward movement of the bottom plunger. As the mold is closed by the downward movement of the bottom plunger, it will readily be seen that the downward pressure of the pressing plunger C will, during the pressing operation, hold the mold firmly closed. The interlocking or inter-fitting of the top of the mold sections with the cover or cap plate D also holds the mold from spreading during the pressing operation.

If a two-part mold is to be used instead of a four-part mold, an opposing two of the mold part carriers 10 are removed, and a mold part 14 of the desired kind is mounted on each of the remaining two carriers, as shown in Fig. 4.

Should a three-part mold be desired, a different ring 7 would have to be used, with the pairs of ears appropriately spaced. This would be true also of a five-part mold.

It will be seen that the mold parts are all moved in absolute synchronism, and that the wear will be substantially equal in each. Repairs can be quickly made, as can the interchange of molds. Various changes and modifications may be made in the construction shown, within the contemplation of my invention and under the scope of the appended claims.

I claim as my invention:

1. A divided mold comprising a support, a plurality of mold part carriers pivotally mounted on the support, each carrier having a substantially vertical and lateral extension, a mold part on each carrier, a reciprocable bottom member centrally disposed with respect to the carriers, and means on the lateral extension of each carrier operatively connected with said reciprocable bottom member for rocking the carrier on its pivot with the reciprocation of the bottom member.

2. A divided mold comprising a support, a plurality of mold parts pivotally carried on the support to rock in a vertical plane toward and from each other, a vertically reciprocable operating member below the support, and means operatively connecting the mold parts with the operating member to rock the same upon reciprocation of the operating member.

3. A divided mold comprising a support, a plurality of mold sections pivotally carried on the support to rock in a vertical plane, each section including a vertically extending mold part and a laterally extending gear segment, a bottom member centrally disposed with respect to mold sections, said bottom member having teeth thereon operatively engaging the gear segments of the mold sections whereby said sections may be rocked upon operation of the bottom member.

4. A glass mold comprising a support, a plurality of mold part carriers pivotally mounted on the support to rock in a vertical plane, each carrier having a vertically extending part and a laterally extending gear-segment, a mold part detachably secured to each carrier, a vertically reciprocable plunger below the support centrally disposed with respect to the carriers and having means at its upper end providing a bottom for the mold, said plunger having teeth near its upper end in mesh with the gear segments of the carrier, whereby the carriers are rocked away from each other on the upward movement of the bottom plunger and rocked toward each other on the downward movement of the bottom plunger.

5. A glass molding device comprising a pressing plunger, a support below the pressing plunger, a plurality of mold sections on the support arranged to rock toward and from each other in a vertical plane, a vertically reciprocable bottom member centrally disposed with respect to the mold sections, operating means connecting the bottom member with the mold sections for rocking the sections toward each other when the bottom member moves downwardly, whereby said mold sections are held tightly together when the bottom member is subjected to pressure by the upper pressing plunger, said operating means also serving to open the mold when the bottom member is raised, and means for raising the bottom member.

6. A glass mold including a support, a plurality of cooperating vertical mold sections horizontally pivoted on the support, a bottom end closure for the mold, a reciprocable element on which the end closure is carried, means for raising and lowering the reciprocable element and a mechanical operating connection between the reciprocable element and the mold sections for opening the latter upon the raising of the former and closing it upon the lowering thereof.

7. A mold comprising a support, a plurality of mold parts horizontally pivoted on the support, a reciprocable member at the bottom of the mold parts centrally disposed with respect to the mold parts, means on the mold parts cooperating with the said member for effecting a closing movement of the mold parts when the said member moves down and opening the mold when the said member moves up, and operating means for the said member.

8. A mold comprising a support, a plurality of mold parts pivotally mounted on the support for movement about horizontal axes, a reciprocable bottom plunger in the mold, and cooperating means on the mold parts and reciprocable bottom plunger for effecting a pivotal movement of the former upon vertical movement of the latter, said means swinging the mold parts inwardly upon downward movement of the plunger and swinging them outwardly upon upward movement thereof, and means for operating the plunger.

9. A glass mold including a fixed support, a plurality of mold sections pivotally mounted thereon for movement about horizontal axes, a reciprocable bottom member for the mold movable up and down between the mold sections, and cooperating parts on the reciprocable bottom member and the mold sections for urging the mold sections together when the bottom member moves down, said bottom member serving to open the mold sections and lift the ware therefrom when it moves up.

10. A mold comprising a fixed support, a plurality of pivoted mold parts thereon, a reciprocable bottom plunger, automatically operable means including cooperating members on the plunger and mold parts actuated by the plunger for opening and closing the mold parts upon reciprocation of the plunger.

In testimony whereof I affix my signature.

CHARLES E. SCHMUNK.